United States Patent [19]
Langley

[11] 4,286,180
[45] Aug. 25, 1981

[54] VARIABLE RELUCTANCE STEPPER MOTOR

[75] Inventor: Lawrence W. Langley, Christiansburg, Va.

[73] Assignee: Kollmorgen Technologies Corporation, Dallas, Tex.

[21] Appl. No.: 926,311

[22] Filed: Jul. 20, 1978

[51] Int. Cl.³ .............................................. H02K 37/00
[52] U.S. Cl. ..................... 310/12; 310/49 R
[58] Field of Search ................... 310/12–14, 310/49, 168; 318/135

[56] References Cited

U.S. PATENT DOCUMENTS

| | | | |
|---|---|---|---|
| 3,869,625 | 3/1978 | Sawyer | 310/12 |
| 3,894,275 | 7/1978 | Baumans et al. | 310/12 |
| 4,075,539 | 2/1978 | Wada | 310/12 X |
| 4,190,779 | 2/1980 | Schaeffer | 310/12 |

OTHER PUBLICATIONS

*IBM Tech. Disclosure Bulletin*, "Linear Incremental Motor", Thompson, vol. 6, No. 9, 2/64, pp. 19–20.

*Primary Examiner*—Donovan F. Duggan

[57] ABSTRACT

A variable reluctance stepper motor including cooperating fixed and moving structures having tooth-like patterns of equal pitch but with the fixed and moving teeth having different lengths, measured in the direction of movement. The smaller teeth are divided into groups which are offset from one another by fractions of a tooth pitch to provide a bi-directional motor capable of being stepped from one position to the next with the teeth tending to produce force in the desired direction carrying essentially all of the flux and the teeth tending to produce force in the opposite direction carrying essentially no flux. Methods and techniques are also disclosed for fabricating tooth structures and bearing systems.

16 Claims, 6 Drawing Figures

VARIABLE RELUCTANCE STEPPER MOTOR

BACKGROUND OF THE INVENTION

The present invention relates to reluctance motors and, more particularly, to variable reluctance stepper motors.

A reluctance motor makes use of the dependence on position of energy in a magnetic circuit to develop mechanical force in the direction of least reluctance. A magnetic circuit provides a path for magnetic flux in much the same way that an electrical circuit provides a path for electrical current. Just as electrical current follows the path of least resistance, magnetic flux follows the path of least reluctance.

One known variable reluctance stepper motor employs a toothed rotor/stator combination in which rotation of the rotor causes a cyclic variation in the reluctance of the magnetic circuit, which includes the rotor and stator teeth and the gap therebetween. The gap changes dimension as the rotor and stator move relative to one another. A motor capable of providing continuous stepping motion is comprised of two or more such sets of rotor/stator teeth, as well as separate magnetic circuits extending therethrough, which circuits are capable of being selectively energized. The different rotor/stator teeth are staggered in relative angular positions. By selective energization of the magnetic circuits, the rotor is caused to assume successive positions of least reluctance for the respective magnetic circuits, depending on the magnetic and mechanical variables designed into the motor and the method of control. In conventional variable reluctance stepper motors, the rotor and stator teeth are of the same or nearly the same width. This configuration produces the greatest possible difference between maximum and minimum reluctance.

BRIEF DESCRIPTION OF THE INVENTION

The present invention involves a novel variable reluctance stepper motor which minimizes undesirable restoring forces and produces a more efficient stepper motor of higher sensitivity. As will be described more fully below, the teeth on one of the cooperating elements of the motor are wider than the teeth on the other cooperating element, while the pitch of the teeth on both elements is the same. In addition, the narrower teeth are divided into groups and are offset with respect to each other by fractions of a tooth pitch.

In a preferred linear embodiment of the present invention the motor comprises a cylindrical slider and a rod-shaped stator. The slider comprises two poles separated by a permanent magnet. Each pole comprises two sets of one or more spiral teeth separated by a winding. Each winding is continuously energized by a current whose direction is controlled. Thus, there are four possible combinations of current directions.

The magnitude of the current is such that the magnetomotive force (MMF) across the teeth on each side of the winding is equal to that produced by the permanent magnet. Current in a given direction will produce a minimum MMF across the teeth on one side of the winding and a maximum MMF across the teeth on the other side of the winding because the direction of the winding MMF aids the permanent magnet MMF on one side and opposes it on the other.

The stator of the linear variable reluctance stepper motor comprises a toothed member having uniformly spaced spiral teeth having a pitch P and a width equal to P/2. The spiral slider teeth have a pitch P and a width equal to P/4. The slider tooth sets on each pole are offset from each other by an amount equal to $(n\pm\frac{1}{2})P$, n being an integer. The poles of the slider are offset from each other by an amount equal to $(m\pm\frac{1}{4})P$, m being an integer.

In a preferred rotary embodiment of the present invention the motor comprises a rotor and a stator. The stator comprises two poles. Between the stator poles is a disk-shaped rotor having uniformly spaced radial teeth having an angular pitch P and an angular width equal to P/2. Each stator pole comprises two sets of radial teeth, the locus of each set describing a circle with a different radius. The stator teeth have an angular pitch P and an angular width equal to P/4. Associated with each stator pole is a permanent ring magnet and a winding. The sets of teeth in each stator pole are offset from each other by an angular amount equal to $(n\pm\frac{1}{2})P$, n being an integer. The stator poles are offset from each other by an angular amount equal to $(m\pm\frac{1}{4})P$, m being an integer. Each winding is continuously energized by a current whose direction is controlled.

In a preferred method for fabricating a stator and bearing system for a linear variable reluctance stepper motor, threads are cut in an iron rod to produce alternating regions of high and low reluctance. The threaded rod is then tin flashed. Next a tinned strip of electrically conducting, nonmagnetic material is fitted into the groove. The rod is next dip soldered and then ground to slightly less than the desired diameter. The rod is then copper flashed and chromium plated to form an extremely hard surface of the desired diameter. A bearing of softer material, which forms a part of the slider, rides on the hard stator surface.

DETAILED DESCRIPTION

Figure 1:
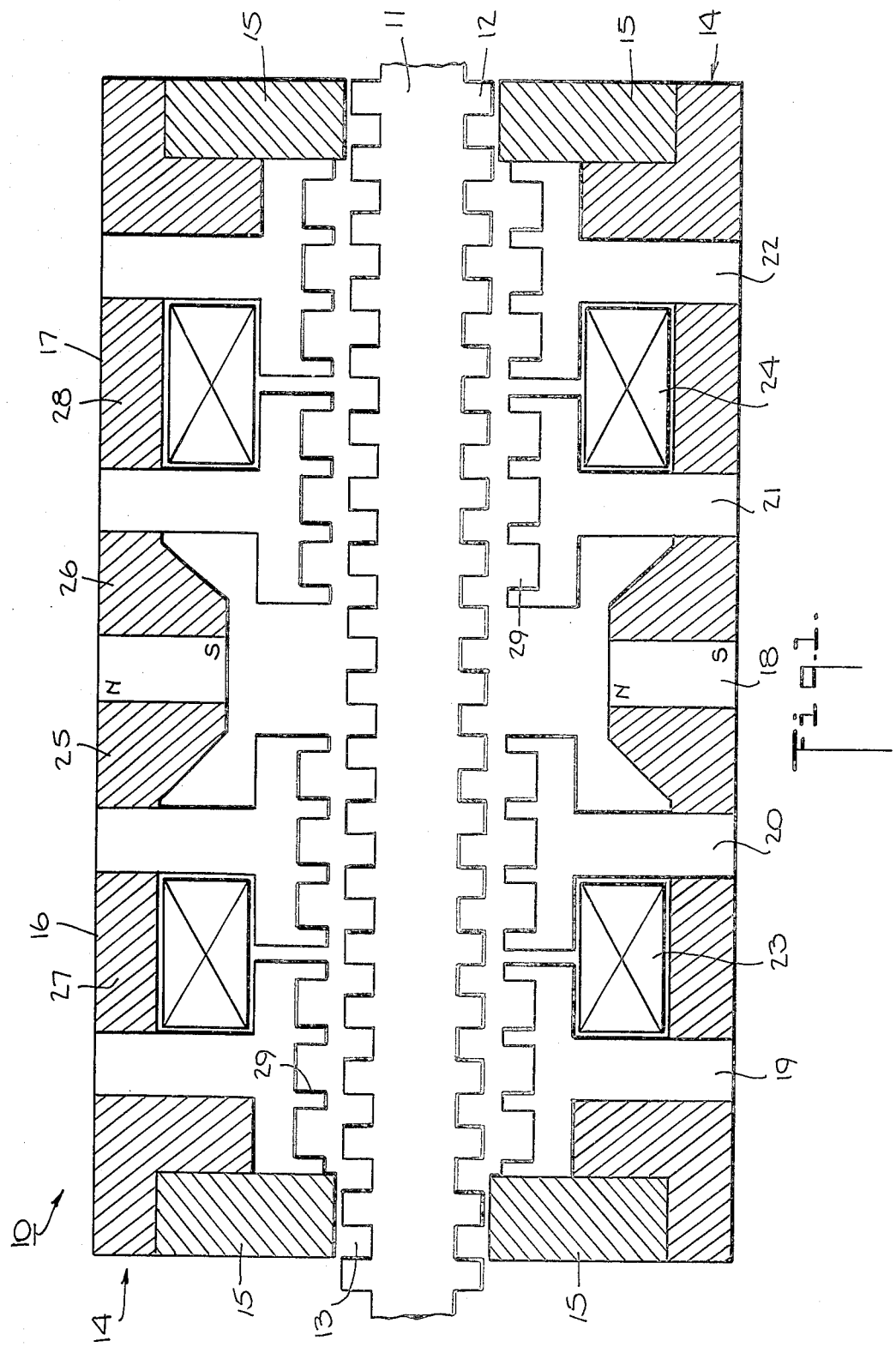
FIG. 1 is a simplified view in section of a linear, variable reluctance stepper motor in accordance with the present invention.

FIG. 1 is a view in section of linear, variable reluctance stepper motor 10 in accordance with the present invention. Stator 11 is an elongated cylindrical rod having teeth 12 and interspersed grooves 13. The teeth have a pitch P and a width P/2. Stator 11 is preferably formed from 2.5% silicon iron.

Cylindrical slider 14 slides along stator 11 on support bearings 15. Slider 14 comprises poles 16 and 17 separated by ring permanent magnet 18, preferably a samarium cobalt magnet. Pole 16 comprises two annular slider elements 19 and 20 while pole 17 comprises two annular slider elements 21 and 22. Slider elements 19 and 20 are separated by winding 23 while slider elements 21 and 22 are separated by winding 24. Between ring permanent magnet 18 and poles 16 and 17 are flux "regulators" 25 and 26. The slider elements and flux "regulators" are formed of 2.5% silicon iron. Annular rings 27 and 28, also of 2.5% silicon iron, provide flux paths between slider elements 19-20 and 21-22, respectively.

Whereas the stator teeth 12 have a pitch P and a width equal to P/2, the slider teeth 29 have a pitch P and a width equal to P/4. In addition, the teeth in slider element 19 and 20 (as well as the teeth in slider elements 21 and 22) are offset from each other by an amount equal to $(n\pm\frac{1}{2})P$, n being an integer. The teeth of poles 16 and 17 are offset from each other by an amount equal to $(m\pm\frac{1}{4})P$, m being an integer.

Motor 10 is "stepped" from one linear position to the next by reversing the direction of current in one of the two control windings 23 and 24. There is no tendency for the slider to move in the wrong direction. The direction of motion is dependent solely upon which winding current is reversed. Also, selectively inactive teeth do not set up any forces which conflict with the direction of the desired forces created by the magnetic energization of the active teeth. Thus, the design of FIG. 1 enables the motor to be stepped in either direction and with good stability.

Figure 2:
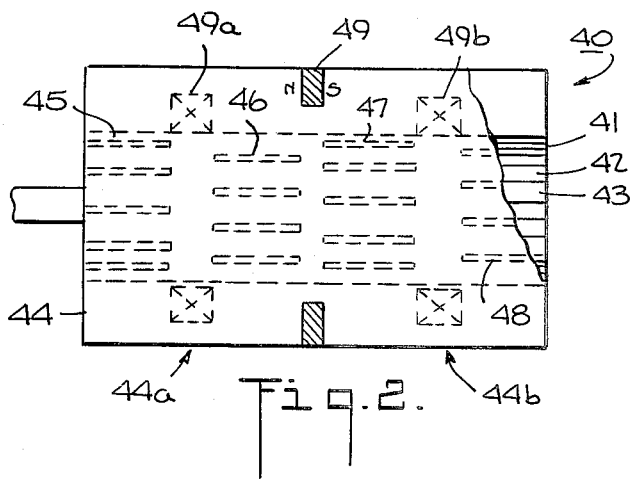
FIG. 2 is a simplified plan view, partially sectioned, of a cylindrical, rotary, variable reluctance stepper motor in accordance with the present invention.

FIG. 2 depicts a cylindrical, rotary variable reluctance stepper motor 40 in accordance with the present invention. Motor 40 comprises a cylindrical rotor 41 having longitudinally extending teeth 42 with grooves 43 therebetween. Teeth 42 have a pitch P and a width equal to P/2. Grooves 43 may be filled with a non-magnetic material so that rotor 41 presents a smooth outer periphery.

Stator 44 is provided with two poles, 44a and 44b. Associated with each of stator poles 44a and 44b are two sets of longitudinally extending stator teeth 45-46 and 47-48. Positioned between stator teeth 45-46 and 47-48 are control windings 49a and 49b, respectively. Stator teeth 45, 46, 57 and 48 have a pitch P and a width equal to P/4. Stator poles 44a and 44b are separated from each other by ring permanent magnet 49. Stator teeth 45 and 46 (as well as stator teeth 47 and 48) are displaced from each other by an angular amount equal to $(n\pm\frac{1}{2})P$, n being an integer. Stator poles 44a and 44b are offset from each other by an angular amount equal to $(m\pm\frac{1}{4})P$, m being an integer.

Control windings 49a and 49b receive control currents of a magnitude sufficient to create an MMF equal to that developed by permanent magnet 49, the direction of current being selected to cause the magnetic flux developed by the control winding either to aid or oppose the magnetic flow of permanent magnet 49. The four possible combinations of current direction establish flux paths through the rotor and stator teeth which are analogous to those created in the linear stepper motor of FIG. 1. The rotary stepper motor is stepped by changing the direction of current of one of control windings 49a or 49b.

Figure 3A:
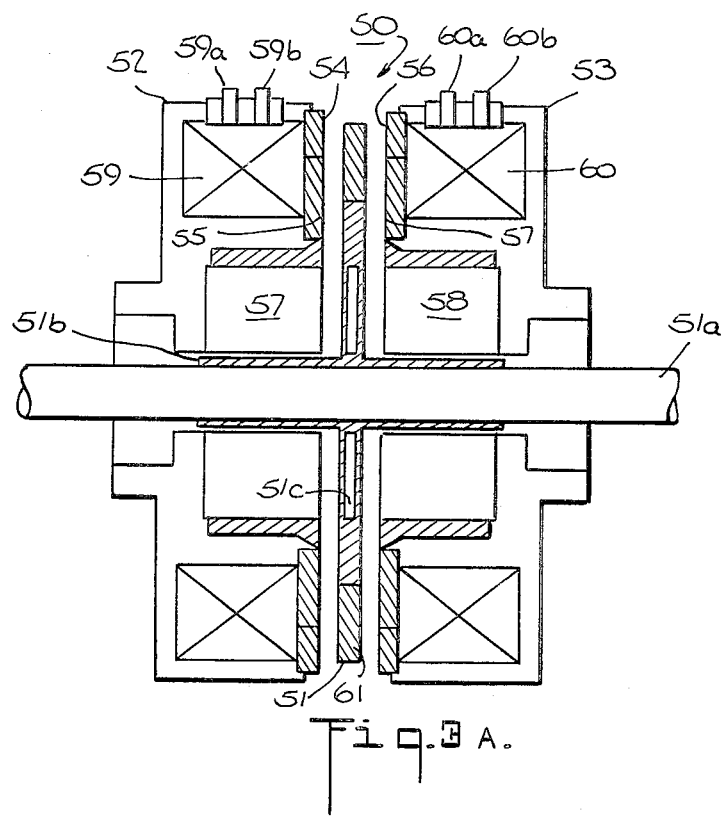
FIG. 3A is a simplified view in section of a disk, rotary, variable reluctance stepper motor in accordance with the present invention.
Figure 3B:
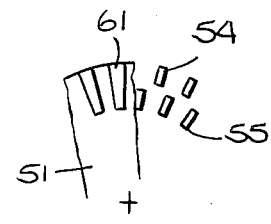
FIG. 3B is a simplified view of the tooth arrangement of the motor of FIG. 3A.

FIGS. 3A and 3B depict a disk, rotary variable reluctance stepper motor 50 in accordance with the present invention. The motor comprises a rotor 51 mounted on a non-magnetic, preferably stainless steel, shaft 51a by means of a central collar 51b, which may be made from an epoxy resin, upon which is mounted an integral soft iron ring 51c. Two stator poles 52 and 53 are disposed on opposite sides of rotor 51. Stator pole 52 comprises two sets of radial, wedge-shaped teeth 54, 55, the locus of each set describing a circle with a different radius. Stator pole 53 comprises two sets of similar stator teeth 56, 57. Associated with stator poles 52 and 53 respectively are permanent ring magnets 57 and 58 preferably of samarium cobalt. Surrounding ring magnets 57 and 58 respectively are coils 59 and 60 having leads 59a–59b and 60a–60b adapted for connection to sources of current whose direction is controllable.

Rotor 51 comprises equally spaced, wedge-shaped radial teeth 61. Rotor teeth 61 and stator teeth 54-56 are preferably made from vanadium permendur. Rotor teeth 61 have an angular pitch P and an angular width P/2. Stator teeth 54-57 have an angular pitch P and an angular width P/4. Stator teeth 54, 55 (as well as stator teeth 56, 57) are offset from each other by an angular amount equal to $(n\pm\frac{1}{2})P$, n being an integer. Stator poles 52 and 53 are offset by an angular amount equal to $(m\pm\frac{1}{4})P$, m being an integer.

FIG. 3B shows the spatial relation between rotor teeth 61 and stator teeth 54, 55. Both the rotor and stator teeth are preferably embedded in epoxy rings.

The current applied to control windings 59, 60 is of a magnitude substantially equal to the MMF of ring-shaped permanent magnets 57, 58, either aiding or opposing. Incremental stepping of the disk-type stepping motor is controlled by switching current direction as described earlier. Although not shown for purposes of simplicity, it should be understood that stator halves 52, 53 are typically enclosed within a non-magnetic housing.

Figure 4B:
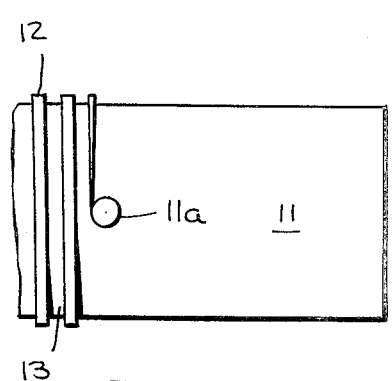
FIG. 4B is a simplified partial plan view of a stator for use with the spiral slider element of FIG. 4A.
Figure 4A:
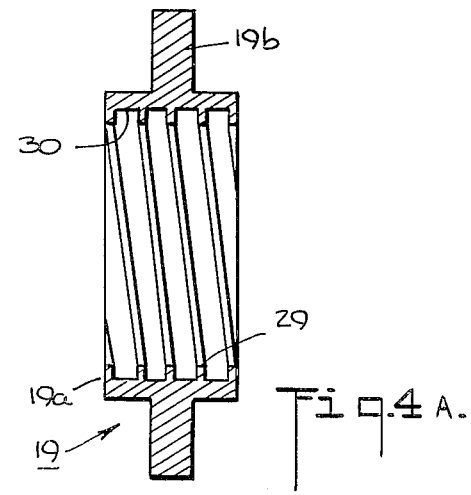
FIG. 4A is a simplified view in section of a slider element for a linear, variable reluctance stepper motor having spiral teeth.

FIGS. 4A and 4B show a spiral slider element and stator for use with a linear variable reluctance stepper motor of FIG. 1. Spiral slider element 19 is comprised of a hollow cylindrical shell 19a having an outwardly extending circular flange 19b provided for mounting purposes. The hollow interior is provided with a tooth pattern comprised of teeth 29 arranged in a regular helix, each tooth having a pitch P and a width equal to P/4. Grooves 30 are three times as wide as teeth 29. Four spiral slider elements are employed in each motor 10 (elements 19, 20, 21 and 22 of FIG. 1). FIG. 4B shows the stator 11 having interspersed teeth 12 and grooves 13. Teeth 12 and grooves 13 have a pitch P and a width equal to P/2. Teeth 12 of the stator form a continuous helix and have square threads.

In a preferred method for fabricating stator 11 an iron bar, preferably 2.5% silicon iron, is machined on a lathe and helical threads of the desired depth are cut therein. The threaded bar is then tin flashed with a very thin electro-deposit of elemental tin so as to make soldering material to the threaded bar possible. Next a tinned strip of electrically conducting, non-magnetic material is fitted into the groove 13 extending the length of the bar. This material may, for example, be copper or aluminum. The strip may be secured to the bar by a screw 11a. After the strip has been placed in groove 13 the bar is soldered, for example by dipping, so as to fill up the space around the tinned strip with solder. Next the bar is ground to a diameter slightly smaller than the desired finished diameter. It may, for example, be ground to a diameter 0.002 inches less than the desired finished diameter. The ground rod is now preferably copper flashed with a very thin copper coating a fraction of a thousandth of an inch thick. The rod is now plated with, for example, a thin layer of a non-magnetic material such as chromium to produce a very hard finish. When chromium is used for plating it is necessary to go through the step of copper flashing. When other plating materials such as nickel are used, the copper flashing step may be omitted.

In the finished structure support bearings 15 ride on stator 11 (See FIG. 1). Where the plating on stator 11 is hard, support bearings 15 are of a softer material. Conversely, where the surface of stator 11 is soft, the support bearing material is harder. For example, where the surface of stator 11 is very hard, e.g., chromium, support bearings 15 are preferably of an oilite sintered bronze material. Alternatively, support bearings 15 may be eliminated and the grooves between teeth 23 of the slider elements may be filled with a Teflon loaded material called "Delrin" or with a nylon loaded material called "Rulon" and employed directly in lieu of bearings 15.

Where stator 11 is plated with a material which is not quite as hard as chromium, such as nickel, then support bearing 15 may be made from aluminum treated with the "Tufram" process of General Magnaplate which has the effect of oxidizing the aluminum to make polycrystalline alumina after which the voids are impregnated with Teflon. This is very hard bearing material which has a low coefficient of friction.

It should be understood that the tooth arrangements heretofore described may be reversed in that the wide teeth or the narrow teeth may be provided on the fixed or on the moving part, the opposite tooth configuration being placed on the moving and fixed parts respectively.

In addition, the permanent magnets, although preferably formed of samarium cobalt, can be formed of any suitable material. Alternatively, they may be electromagnets. Magnetic paths may be either solid or laminated and the coils may be located as shown or wound directly around the teeth to provide different coupling for their MMF's. In the linear embodiment, the cross section of the inner member need not be round but may be square, hexagonal or any other desired shape. An inner member having a round cross section is preferred because it is easier to manufacture.

It can be seen from the foregoing description that the present invention provides novel and highly useful variable reluctance stepper motors. Undesirable opposing forces generated by those teeth which do not form a portion of the active flux path are minimized, so long as the currents in the control windings develop an MMF which creates a balanced condition with the MMF of the permanent magnet, thereby resulting in a highly useful force per unit weight of the reluctance force motor.

The number of teeth employed and, therefore, the size of motion increments, is not limited by any ratio or formula involving pole and slot counts as is the case with vernier steppers. If the desired number of rotary steps is divisible by four, a motor can be designed to provide directly this capability. If the desired number of steps is divisible by two but not by four, then the motor must have two electrical steps per design step. To provide an odd number of steps per revolution of the motor, the motor must be designed with four electrical steps per design step. In most cases, however, one to three steps can be added to the design value to simplify the design. On the other hand, linear motors can be designed to have any pitch within the practical limits of physical size and gap tolerances. Although gap tolerances should be close, they fall well within practical ranges.

In addition to the above capabilities and variations, other variations are possible. For example, the motors may be rotory or linear as described above. Alternatively, a rotary stepper may be mounted upon movable elements of a linear stepper, or vice versa. As a further alternative, in a linear embodiment either the slider or stator or both may be driven so as to impart rotational movement thereto.

Although this invention has been described with respect to its preferred embodiments, it should be understood that many variations and modifications will now be obvious to those skilled in the art. Accordingly, the scope of the invention is limited, not by the specific disclosure herein, but only by the appended claims.

What I claim is:

1. A variable reluctance, bi-directional stepper motor comprising:

a first member having a plurality of teeth, each of said teeth having both a pitch P and a width equal to P/2; and a second member moveable relative to said first member, said second member comprising two poles, each pole having two sets of teeth, each of said teeth having both a pitch P and a width equal to P/4, the sets of teeth in each pole being offset from each other by an amount equal to $(n \pm \frac{1}{2})P$, n being an integer, said poles being offset from each other by an amount equal to $(m \pm \frac{1}{4})P$, m being an integer, each of said poles having associated therewith a winding adapted for connection to a direct current source, said second member having associated therewith at least one magnet.

2. A motor according to claim 1 wherein said first member is stationary and said second member moves.

3. A motor according to claim 1 wherein said second member is stationary and said first member moves.

4. A linear, variable reluctance, bi-directional stepper motor comprising:

a first cylindrical member having a plurality of regular helical teeth with grooves therebetween, each of said teeth having both a pitch P and a width equal to P/2; and a second cylindrical member surrounding at least a portion of said first member, said second member comprising two annular poles separated by an annular permanent magnet, each pole having two annular elements separated by an annular winding, adapted for connection to a direct current source, each element having a set of regular helical teeth with grooves therebetween, each of said teeth having both a pitch P and a width equal to P/4, the sets of teeth in each pole being offset longitudinally from each other by an amount equal to $(n \pm \frac{1}{2})P$, n being an integer, said poles being offset from each other in the longitudinal direction by an amount equal to $(m \pm \frac{1}{4})P$, m being an integer.

5. The motor according to claim 4 wherein said second element includes annular flux carrying members disposed on each side of said permanent magnet and between said permanent magnet and each pole, the cross section of said flux carrying members narrowing from said magnet toward each of said poles.

6. The motor according to claim 5 wherein said grooves of said elements are filled with a Teflon loaded material.

7. The motor according to claim 5 wherein said grooves of said elements are filled with a nylon loaded material.

8. The motor according to claim 5 wherein said second member further comprises a plurality of annular-shaped support bearings for supporting said second member on said first member.

9. The motor according to claim 8 wherein said first member includes a plated chromium coating thereon and said support bearings comprise oilite sintered bronze material.

10. The motor according to claim 8 wherein said first member includes a plated nickel coating thereon and said support bearings comprise treated aluminum impregnated with Teflon.

11. A disk, rotary, variable reluctance, bi-directional stepper motor comprising:
a disk-shaped rotor mounted on a shaft and having a plurality of wedge-shaped, radially extending equally spaced teeth having an angular pitch P and an angular width equal to P/2; and
a stator comprising two poles one disposed on each side of said rotor, each stator pole having two sets of wedge-shaped, radially extending, equally spaced teeth having an angular pitch P and an angular width equal to P/4, the locii of said sets of stator teeth describing circles having two different radii, the sets of teeth in each stator pole being offset from each other by an angular amount equal to $(n\pm\frac{1}{2})P$, n being an integer, the two stator poles being offset from each other by an angular amount equal to $(m\pm\frac{1}{4})P$, m being an integer, each stator pole also including an annular magnet and an annular winding adapted for connection to a direct current source.

12. A motor according to claim 11 wherein said rotor further includes an annular-shaped iron ring disposed between said shaft and said rotor teeth to conduct flux between said stator poles.

13. A motor according to claim 13 wherein the magnet is a rare earth permanent magnet.

14. A cylindrical, rotary, variable bi-directional stepper motor comprising:
a cylindrical rotor having a plurality of longitudinally extending teeth with grooves therebetween, said rotor teeth having an angular pitch P and an angular width equal to P/2; and
a cylindrical stator surrounding said rotor, said stator having two annular poles separated by an annular magnet, each stator pole having two sets of equally spaced, longitudinally extending teeth having an angular pitch P and an angular width equal to P/4, the sets of teeth in each stator pole being offset from each other by an angular amount equal to $(n\pm\frac{1}{2})P$, n being an integer, the two stator poles being offset from each other by an angular amount equal to $(m\pm\frac{1}{4})P$, m being an integer, the sets of teeth in each stator pole being separated by an annular winding adapted for connection to a direct current source.

15. The motor according to claim 14 wherein said magnet is a rare earth permanent magnet.

16. A variable reluctance, bi-directional stepper motor comprising:
a first member having a plurality of teeth, each of said teething having both a pitch P and a width equal to P/2; and
a second member moveable relative to said first member, said second member comprising two poles, each pole having two sets of teeth, each of said teeth having both a pitch P and a width equal to P/4, the sets of teeth in each pole being offset from each other by an amount equal to $(n\pm\frac{1}{2})P$, n being an integer, said poles being offset from each other by an amount equal to $(m\pm\frac{1}{4})P$, m being an integer, each of said poles having associated therewith a winding adapted for connection to a direct current source, said second member having associated therewith at least one permanent magnet.

* * * * *